US008655659B2

(12) United States Patent
Wang et al.

(10) Patent No.: US 8,655,659 B2
(45) Date of Patent: Feb. 18, 2014

(54) PERSONALIZED TEXT-TO-SPEECH SYNTHESIS AND PERSONALIZED SPEECH FEATURE EXTRACTION

(75) Inventors: Qingfang Wang, Beijing (CN); Shouchun He, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 714 days.

(21) Appl. No.: 12/855,119

(22) Filed: Aug. 12, 2010

(65) Prior Publication Data

US 2011/0165912 A1 Jul. 7, 2011

(30) Foreign Application Priority Data

Jan. 5, 2010 (CN) .......................... 2010 1 0002312

(51) Int. Cl.
*G10L 15/00* (2013.01)
*G10L 13/00* (2006.01)
*G10L 21/00* (2013.01)

(52) U.S. Cl.
USPC ........... 704/258; 704/231; 704/232; 704/233; 704/234; 704/235; 704/251; 704/260; 704/266; 704/268; 704/270; 704/275; 704/277

(58) Field of Classification Search
USPC ......... 704/231–235, 251, 258, 260, 266, 268, 704/270, 275
See application file for complete search history.

(56) References Cited

U.S. PATENT DOCUMENTS 6,263,308 B1 * 7/2001 Heckerman et al. .......... 704/231
6,347,298 B2 * 2/2002 Vitale et al. ................... 704/260
6,499,014 B1 * 12/2002 Chihara ........................ 704/260
6,792,407 B2 * 9/2004 Kibre et al. .................. 704/260
7,143,038 B2 * 11/2006 Katae ........................... 704/258
7,181,395 B1 * 2/2007 Deligne et al. ................ 704/249
7,266,495 B1 * 9/2007 Beaufays et al. ............. 704/236
7,277,855 B1 10/2007 Acker et al.

(Continued)

FOREIGN PATENT DOCUMENTS

EP 1 248 251 A2 10/2002

OTHER PUBLICATIONS

International Preliminary Report on Patentability and Written Opinion of the International Searching Authority, corresponding to PCT/IB2010/003113, date of mailing Jul. 19, 2012.

(Continued)

*Primary Examiner* — Paras D Shah
(74) *Attorney, Agent, or Firm* — Renner, Otto, Boisselle & Sklar, LLP

(57) ABSTRACT

A personalized text-to-speech synthesizing device includes: a personalized speech feature library creator, configured to recognize personalized speech features of a specific speaker by comparing a random speech fragment of the specific speaker with preset keywords, thereby to create a personalized speech feature library associated with the specific speaker, and store the personalized speech feature library in association with the specific speaker; and a text-to-speech synthesizer, configured to perform a speech synthesis of a text message from the specific speaker, based on the personalized speech feature library associated with the specific speaker and created by the personalized speech feature library creator, thereby to generate and output a speech fragment having pronunciation characteristics of the specific speaker. A personalized speech feature library of a specific speaker is established without a deliberate training process, and a text is synthesized into personalized speech with the speech characteristics of the speaker.

37 Claims, 4 Drawing Sheets

(56) References Cited

U.S. PATENT DOCUMENTS

| | | | | |
|---|---|---|---|---|
| 7,280,968 | B2 * | 10/2007 | Blass | 704/266 |
| 7,292,980 | B1 * | 11/2007 | August et al. | 704/254 |
| 7,313,522 | B2 * | 12/2007 | Fukuzato | 704/258 |
| 7,483,832 | B2 * | 1/2009 | Tischer | 704/260 |
| 7,590,533 | B2 * | 9/2009 | Hwang | 704/231 |
| 7,630,898 | B1 * | 12/2009 | Davis et al. | 704/266 |
| 7,921,014 | B2 * | 4/2011 | Kurata et al. | 704/260 |
| 8,024,193 | B2 * | 9/2011 | Bellegarda | 704/269 |
| 8,340,967 | B2 * | 12/2012 | Silbert et al. | 704/267 |
| 2004/0117180 | A1 * | 6/2004 | Rajput et al. | 704/231 |
| 2005/0038657 | A1 * | 2/2005 | Roth et al. | 704/260 |
| 2005/0143970 | A1 * | 6/2005 | Roth et al. | 704/4 |
| 2006/0229873 | A1 * | 10/2006 | Eide et al. | 704/260 |
| 2006/0241936 | A1 * | 10/2006 | Katae | 704/6 |
| 2007/0016421 | A1 * | 1/2007 | Nurminen et al. | 704/260 |
| 2007/0016422 | A1 * | 1/2007 | Mori et al. | 704/260 |
| 2007/0233493 | A1 * | 10/2007 | Nakao | 704/260 |
| 2007/0239455 | A1 * | 10/2007 | Groble et al. | 704/260 |
| 2008/0109225 | A1 * | 5/2008 | Sato | 704/260 |
| 2008/0235024 | A1 * | 9/2008 | Goldberg et al. | 704/260 |
| 2009/0150155 | A1 * | 6/2009 | Endo et al. | 704/255 |
| 2010/0049518 | A1 * | 2/2010 | Ferrieux | 704/254 |
| 2010/0057435 | A1 * | 3/2010 | Kent et al. | 704/3 |
| 2010/0217600 | A1 * | 8/2010 | Lobzakov | 704/260 |

OTHER PUBLICATIONS

International Search Report, corresponding to PCT/IB2010/003113, mailed on May 17, 2011.

Written Opinion of the International Searching Authority, corresponding to PCT/IB2010/003113, mailed on May 17, 2011.

* cited by examiner

| Language | Speaker ( Group ) | Keyword |
|---|---|---|
| Chinese | Peiking Man | 喂，我，您，好，这，那， |
| English | New Yorker | hi ,hello ,I ,you ,whoops ,sorry ,but ,...... |
| Japanese | ...... | ...... |

PERSONALIZED TEXT-TO-SPEECH SYNTHESIS AND PERSONALIZED SPEECH FEATURE EXTRACTION

FIELD OF THE INVENTION

The present invention generally relates to speech feature extraction and Text-To-Speech synthesis (TTS) techniques, and particularly, to a method and device for extracting personalized speech features of a person by comparing his/her random speech fragment with preset keywords, a method and device for performing personalized TTS on a text message from the person by using the extracted personalized speech features, and a communication terminal and a communication system including the device for performing the personalized TTS.

BACKGROUND OF THE INVENTION

TTS is a technique used for text-to-speech synthesis, and particularly, a technique that converts any text information into a standard and fluent speech. TTS concerns multiple advanced high technologies such as natural language processing, metrics, speech signal processing and audio sense, stretches across multiple subjects like acoustics, linguistics and digital signal processing, and is an advanced technique in the field of text information processing.

The traditional TTS system pronounces with only one standard male or female voice. The voice is monotonic and cannot reflect various speaking habits of all kinds of persons in life; for example, if the voice lacks amusement, the listener or audience may not feel amiable or appreciate the intended humor.

For instance, the U.S. Pat. No. 7,277,855 provides a personalized TTS solution. In accordance with the solution, a specific speaker speaks a fixed text in advance, and some speech feature data of the specific speaker is acquired by analyzing the generated speech, then a TTS is performed based on the speech feature data with a standard TTS system, so as to realize a personalized TTS. The main problem of the solution is that the speech feature data of the specific speaker would be acquired through a special "study" process, while much time and energy would be spent in the "study" process and there is no enjoyment, besides, the validity of the "study" effect is obviously influenced by the selected material.

With the popularization of such devices having functions of both text transfer and speech communication, a technology is needed that can easily acquire personalized speech features of any one or both parties of the communication when a subscriber performs a speech communication through the device, and can represent a text by synthesizing it into speech based on the acquired personalized speech during the subsequent text communication.

In addition, there is a need for a technology that can easily and accurately recognize the speech features of a subscriber for further utilization from a random speech segment of the subscriber.

SUMMARY OF THE INVENTION

According to an aspect of the present invention a TTS technique does not require a specific speaker to read aloud a special text. Instead, the TTS technique acquires speech feature data of the specific speaker in a normal speaking process by the specific speaker, not necessarily for the TTS, and subsequently applies the acquired speech feature data having pronunciation characteristics of the specific speaker to a TTS process for a special text, so as to acquire natural and fluent synthesized speech having the speech style of the specific speaker.

A first aspect of the invention provides a personalized text-to-speech synthesizing device, including:

a personalized speech feature library creator, configured to recognize personalized speech features of a specific speaker by comparing a random speech fragment of the specific speaker with preset keywords, thereby to create a personalized speech feature library associated with the specific speaker, and store the personalized speech feature library in association with the specific speaker; and a text-to-speech synthesizer, configured to perform a speech synthesis of a text message from the specific speaker, based on the personalized speech feature library associated with the specific speaker and created by the personalized speech feature library creator, thereby to generate and output a speech fragment having pronunciation characteristics of the specific speaker.

A second aspect of the invention provides a personalized text-to-speech synthesizing device according to the first aspect of the invention, wherein the personalized speech feature library creator includes:

a keyword setting unit, configured to set one or more keywords suitable for reflecting the pronunciation characteristics of the specific speaker with respect to a specific language, and to store the set keywords in association with the specific speaker;

a speech feature recognition unit, configured to recognize whether any keyword associated with the specific speaker occurs in the speech fragment of the specific speaker, and when a keyword associated with the specific speaker is recognized as occurring in the speech fragment of the specific speaker, recognize the speech features of the specific speaker according to a standard pronunciation of the recognized keyword and the pronunciation of the specific speaker; and a speech feature filtration unit, configured to filter out abnormal speech features through statistical analysis while retaining speech features reflecting the normal pronunciation characteristics of the specific speaker, when the speech features of the specific speaker recognized by the speech feature recognition unit reach a predetermined number, thereby to create the personalized speech feature library associated with the specific speaker, and store the personalized speech feature library in association with the specific speaker.

A third aspect of the invention provides a personalized text-to-speech synthesizing device according to the second aspect of the invention, wherein the keyword setting unit is further configured to set keywords suitable for reflecting the pronunciation characteristics of the specific speaker with respect to a plurality of specific languages.

A fourth aspect of the invention provides a personalized text-to-speech synthesizing device according to the second aspect of the invention, wherein the speech feature recognition unit is further configured to recognize whether the keyword occurs in the speech fragment of the specific speaker by comparing the speech fragment of the specific speaker with the standard pronunciation of the keyword in terms of their respective speech frequency spectrums, which are derived by performing a time-to-frequency-domain conversion on the respective speech data in time domain.

A fifth aspect of the invention provides a personalized text-to-speech synthesizing device according to the first aspect of the invention, wherein the personalized speech feature library creator is further configured to update the personalized speech feature library associated with the specific speaker when a new speech fragment of the specific speaker is received.

A sixth aspect of the invention provides a personalized text-to-speech synthesizing device according to the second aspect of the invention, wherein parameters representing the speech features include frequency, volume, rhythm and end sound.

A seventh aspect of the invention provides a personalized text-to-speech synthesizing device according to the sixth aspect of the invention, wherein the speech feature filtration unit is further configured to filter speech features with respect to the parameters representing the respective speech features.

An eighth aspect of the invention provides a personalized text-to-speech synthesizing device according to the first aspect of the invention, wherein the keyword is a monosyllable high frequency word.

A ninth aspect of the invention provides a personalized text-to-speech synthesizing method, including:

presetting one or more keywords with respect to a specific language;

receiving a random speech fragment of a specific speaker;

recognizing personalized speech features of the specific speaker by comparing the received speech fragment of the specific speaker with the preset keywords, thereby creating a personalized speech feature library associated with the specific speaker, and storing the personalized speech feature library in association with the specific speaker; and performing a speech synthesis of a text message from the specific speaker, based on the personalized speech feature library associated with the specific speaker, thereby generating and outputting a speech fragment having pronunciation characteristics of the specific speaker.

A tenth aspect of the invention provides a personalized text-to-speech synthesizing method according to the ninth aspect of the invention, wherein the keywords are suitable for reflecting the pronunciation characteristics of the specific speaker and stored in association with the specific speaker.

An eleventh aspect of the invention provides a personalized text-to-speech synthesizing method according to the tenth aspect of the invention, wherein creating the personalized speech feature library associated with the specific speaker includes:

recognizing whether any preset keyword associated with the specific speaker occurs in the speech fragment of the specific speaker;

when a keyword associated with the specific speaker is recognized as occurring in the speech fragment of the specific speaker, recognizing the speech features of the speaker according to a standard pronunciation of the recognized keyword and the pronunciation of the specific speaker; and filtering out abnormal speech features through statistical analysis while retaining speech features reflecting the normal pronunciation characteristics of the specific speaker, when the recognized speech features of the specific speaker reach a predetermined number, thereby creating the personalized speech feature library associated with the specific speaker, and storing the personalized speech feature library in association with the specific speaker.

A twelfth aspect of the invention provides a personalized text-to-speech synthesizing method according to the eleventh aspect of the invention, wherein keywords suitable for reflecting the pronunciation characteristics of the specific speaker are set with respect to a plurality of specific languages.

A thirteenth aspect of the invention provides a personalized text-to-speech synthesizing method according to the eleventh aspect of the invention, wherein recognizing whether the keyword occurs in the speech fragment of the specific speaker is performed by comparing the speech fragment of the specific speaker with the standard pronunciation of the keyword in terms of their respective speech frequency spectrums, which are derived by performing a time-to-frequency-domain conversion on the respective speech data in time domain.

A fourteenth aspect of the invention provides a personalized text-to-speech synthesizing method according to the ninth aspect of the invention, wherein the creating the personalized speech feature library includes updating the personalized speech feature library associated with the specific speaker when a new speech fragment of the specific speaker is received.

A fifteenth aspect of the invention provides a personalized text-to-speech synthesizing method according to the eleventh aspect of the invention, wherein parameters representing the speech features include frequency, volume, rhythm and end sound.

A sixteenth aspect of the invention provides a personalized text-to-speech synthesizing method according to the fifteenth aspect of the invention, wherein the speech features are filtered with respect to the parameters representing the respective speech features.

A seventeenth aspect of the invention provides a personalized text-to-speech synthesizing method according to the ninth aspect of the invention, wherein the keyword is a monosyllable high frequency word.

An eighteenth aspect of the invention provides a communication terminal capable of text transmission and speech session, wherein a number of the communication terminals are connected to each other through a wireless communication network or a wired communication network, so that a text transmission or speech session can be carried out therebetween, wherein the communication terminal includes a text transmission synthesizing device, a speech session device and the personalized text-to-speech synthesizing device according to any of the first to eighth aspects of the invention.

A nineteenth aspect of the invention provides a communication terminal according to the eighteenth aspect of the invention, further including:

a speech feature recognition trigger device, configured to trigger the personalized text-to-speech synthesizing device to perform a personalized speech feature recognition of speech fragment of any or both speakers in a speech session, when the communication terminal is used for the speech session, thereby to create and store a personalized speech feature library associated with the any or both speakers in the speech session; and a text-to-speech trigger synthesis device, configured to enquire whether any personalized speech feature library associated with a subscriber transmitting a text message or a subscriber from whom a text message is received is included in the communication terminal when the communication terminal is used for transmitting or receiving text messages, and trigger the personalized text-to-speech synthesizing device to synthesize the text messages to be transmitted or having been received into a speech fragment when the enquiry result is affirmative, and transmit the speech fragment to the counterpart or display to the local subscriber at the communication terminal.

A twentieth aspect of the invention provides a communication terminal according to the eighteenth or nineteenth aspect of the invention, wherein the communication terminal is a mobile phone.

A twenty-first aspect of the invention provides a communication terminal according to the eighteenth or nineteenth aspect of the invention, wherein the communication terminal is a computer client.

A twenty-second aspect of the invention provides a communication system capable of text transmission and speech session, including a controlling device, and a plurality of communication terminals capable of text transmission and speech session via the controlling device, wherein the controlling device is provided with the personalized text-to-speech synthesizing device according to any of the first to eighth aspects of the invention.

A twenty-third aspect of the invention provides a communication system according to the twenty-second aspect of the invention, wherein the controlling device further includes:

a speech feature recognition trigger device, configured to trigger the personalized text-to-speech synthesizing device to perform a personalized speech feature recognition of speech fragments of speakers in a speech session, when two or more of the plurality of communication terminals are used for the speech session via the controlling device, thereby to create and store personalized speech feature libraries associated with respective speakers in the speech session respectively; and a text-to-speech trigger synthesis device configured to enquire whether any personalized speech feature library associated with a subscriber transmitting a text message occurs in the controlling device when the controlling device receives the text messages transmitted by any of the plurality of communication terminals to another communication terminal, trigger the personalized text-to-speech synthesizing device to synthesize the text messages having been received into a speech fragment when the enquiry result is affirmative, and transfer the speech fragment to the another communication terminal.

A twenty-fourth aspect of the invention provides a communication system according to the twenty-second or twenty-third aspect of the invention, wherein the controlling device is a wireless network controller, the communication terminal is a mobile phone, and the wireless network controller and the mobile phone are connected to each other through a wireless communication network.

A twenty-fifth aspect of the invention provides a communication system according to the twenty-second or twenty-third aspect of the invention, wherein the controlling device is a server, the communication terminal is a computer client, and the server and the computer client are connected to each other through Internet.

A twenty-sixth aspect of the invention provides a computer program product recorded on a computer readable recording medium, which is readable by a computer when being loaded onto the computer, and computer program code means recorded in the computer readable recording medium is executed by the computer, so as to implement the personalized text-to-speech, wherein the computer program code means includes:

computer program code means configured to preset one or more keywords with respect to a specific language;

computer program code means configured to receive a random speech fragment of a specific speaker;

computer program code means configured to recognize personalized speech features of the specific speaker by comparing the received speech fragment of the specific speaker with the preset keywords, thereby to create a personalized speech feature library associated with the specific speaker, and store the personalized speech feature library in association with the specific speaker; and computer program code means configured to perform a speech synthesis of a text message from the specific speaker, based on the personalized speech feature library associated with the specific speaker, thereby to generate and output a speech fragment having pronunciation characteristics of the specific speaker.

A twenty-seventh aspect of the invention provides a computer program product according to the twenty-sixth aspect of the invention, wherein the keywords are set as being suitable for reflecting the pronunciation characteristics of the specific speaker, and are stored in association with the specific speaker.

A twenty-eighth aspect of the invention provides a computer program product according to the twenty-seventh aspect of the invention, wherein the computer program code means configured to create the personalized speech feature library associated with the specific speaker includes:

computer program code means configured to recognize whether any preset keyword associated with the specific speaker occurs in the speech fragment of the specific speaker;

computer program code means configured to recognize the speech features of the speaker according to a standard pronunciation of the recognized keyword and the pronunciation of the specific speaker, when a keyword associated with the specific speaker is recognized as occurring in the speech fragment of the specific speaker; and computer program code means configured to filter out abnormal speech features through statistical analysis while retaining speech features reflecting the normal pronunciation characteristics of the specific speaker, when the speech features of the specific speaker recognized by the speech feature recognition unit reach a predetermined number, thereby to create the personalized speech feature library associated with the specific speaker, and store the personalized speech feature library in association with the specific speaker.

A twenty-ninth aspect of to the invention provides a computer program product according to the twenty-eighth aspect of the invention, wherein keywords suitable for reflecting the pronunciation characteristics of the specific speaker are set with respect to a plurality of specific languages.

A thirty aspect of the invention provides a computer program product according to the twenty-eighth aspect of the invention, wherein whether the keyword occurs in the speech fragment of the specific speaker is recognized by comparing the speech fragment of the specific speaker with the standard pronunciation of the keyword in terms of their respective speech frequency spectrums, which are derived by performing a time-to-frequency-domain conversion on the respective speech data in time domain.

A thirty-first aspect of the invention provides a computer program product according to the twenty-sixth aspect of the invention, wherein the computer program code means configured to create the personalized speech feature library includes: computer program code means configured to update the personalized speech feature library associated with the specific speaker, when a new speech fragment of the specific speaker is received.

A thirty-second aspect of the invention provides a computer program product according to the twenty-eighth aspect of the invention, wherein parameters representing the speech features include frequency, volume, rhythm and end sound.

A thirty-third aspect of the invention provides a computer program product according to the thirty-second aspect of the invention, wherein the speech features are filtered with respect to the parameters representing the respective speech features.

A thirty-fourth aspect of the invention provides a computer program product according to the twenty-sixth aspect of the invention, wherein the keyword is a monosyllable high frequency word.

A thirty-fifth aspect of the invention provides a personalized speech feature extraction device, including:

a keyword setting unit, configured to set one or more keywords suitable for reflecting the pronunciation characteristics of a specific speaker with respect to a specific language, and store the keywords in association with the specific speaker;

a speech feature recognition unit, configured to recognize whether any keyword associated with the specific speaker occurs in a random speech fragment of the specific speaker, and when a keyword associated with the specific speaker is recognized as occurring in the speech fragment of the specific speaker, recognize the speech features of the specific speaker according to a standard pronunciation of the recognized keyword and the pronunciation of the speaker; and a speech feature filtration unit, configured to filter out abnormal speech features through statistical analysis while retaining speech features reflecting the normal pronunciation characteristics of the specific speaker, when the speech features of the specific speaker recognized by the speech feature recognition unit reach a predetermined number, thereby to create a personalized speech feature library associated with the specific speaker, and store the personalized speech feature library in association with the specific speaker.

A thirty-sixth aspect of the invention provides a personalized speech feature extraction device according to the thirty-fifth aspect of the invention, wherein the keyword setting unit is further configured to set keywords suitable for reflecting the pronunciation characteristics of the specific speaker with respect to a plurality of specific languages.

A thirty-seventh aspect of the invention provides a personalized speech feature extraction device according to the thirty-fifth aspect of the invention, wherein the speech feature recognition unit is further configured to recognize whether the keyword occurs in the speech fragment of the specific speaker by comparing the speech fragment of the specific speaker with the standard pronunciation of the keyword in terms of their respective speech frequency spectrums, which are derived by performing a time-to-frequency-domain conversion on the respective speech data in time domain.

A thirty-eighth aspect of the invention provides a personalized speech feature extraction device according to the thirty-fifth aspect of the invention, wherein parameters representing the speech features include frequency, volume, rhythm and end sound.

A thirty-ninth aspect of the invention provides a personalized speech feature extraction device according to the thirty-eighth aspect of the invention, wherein the speech feature filtration unit is further configured to filter out speech features with respect to the parameters representing the respective speech features.

A fortieth aspect of the invention provides a personalized speech feature extraction device according to the thirty-fifth aspect of the invention, wherein the keyword is a monosyllable high frequency word.

A forty-first aspect of the invention provides a personalized speech feature extraction method, including:

setting one or more keywords suitable for reflecting the pronunciation characteristics of a specific speaker with respect to a specific language, and storing the keywords in association with the specific speaker;

recognizing whether any keyword associated with the specific speaker occurs in a random speech fragment of the specific speaker, and when a keyword associated with the specific speaker is recognized as occurring in the speech fragment of the specific speaker, recognizing the speech features of the specific speaker according to a standard pronunciation of the recognized keyword and the pronunciation of the speaker; and filtering out abnormal speech features through statistical analysis while retaining speech features reflecting the normal pronunciation characteristics of the specific speaker, when the speech features of the specific speaker recognized by the speech feature recognition unit reach a predetermined number, thereby creating a personalized speech feature library associated with the specific speaker, and storing the personalized speech feature library in association with the specific speaker.

A forty-second aspect of the invention provides a personalized speech feature extraction method according to the forty-first aspect of the invention, wherein the setting includes: setting keywords suitable for reflecting the pronunciation characteristics of the specific speaker with respect to a plurality of specific languages.

A forty-third aspect of the invention provides a personalized speech feature extraction method according to the forty-first aspect of the invention, wherein the recognizing includes: recognizing whether the keyword occurs in the speech fragment of the specific speaker by comparing the speech fragment of the specific speaker with the standard pronunciation of the keyword in terms of their respective speech frequency spectrums, which are derived by performing a time-to-frequency-domain conversion on the respective speech data in time domain.

A forty-fourth aspect of the invention provides a personalized speech feature extraction method according to the forty-first aspect of the invention, wherein parameters representing the speech features include frequency, volume, rhythm and end sound.

A forty-fifth aspect of the invention provides a personalized speech feature extraction method according to the forty-fourth aspect of the invention, wherein the filtering includes: filtering out speech features with respect to the parameters representing the respective speech features.

A forty-sixth aspect of the invention provide a personalized speech feature extraction method according to the forty-first aspect of the invention, wherein the keyword is a monosyllable high frequency word.

With the technical solutions according to the present invention, it is not necessary for a specific speaker to read aloud a special text with respect to the TTS, instead, the technical solutions acquire the speech feature data of the specific speaker automatically or upon instruction during a random speaking process (e.g., calling process) by the specific speaker, while the specific speaker is "aware or ignorant of the case"; subsequently (e.g., after acquiring text messages sent by the specific speaker) performs a speech synthesis of the acquired text messages by automatically using the acquired speech feature data of the specific speaker, and finally outputs natural and fluent speeches having the speech style of the specific speaker. Thus, the defects of monotone and inflexibility of a speech synthesized by the standard TTS technique are avoided, and the synthesized speech is obviously recognizable.

In addition, with the technical solutions according to the present invention, the speech feature data is acquired from the speech fragment of the specific speaker through the method of keyword comparison, and this can reduce the calculation amount and improve the efficiency for the speech feature recognition process.

In addition, the keywords can be selected with respect to different languages, persons and fields, so as to accurately and efficiently grasp the speech characteristics under each specific situation, therefore, not only speech feature data can be efficiently acquired, but also a synthesized speech accurately recognizable can be obtained.

With the personalized speech feature extraction solution according to the present invention, the speech feature data of the speaker can be easily and accurately acquired by comparing a random speech of the speaker with the preset keywords, so as to further apply the acquired speech feature data to personalized TTS or other application occasions, such as accent recognition.

BRIEF DESCRIPTION OF THE DRAWINGS

Constituting a part of the Specification, the drawings are provided for further understanding of the present invention by illustrating the preferred embodiments of the present invention, and elaborating the principle of the present invention together with the literal descriptions. The same element is represented with the same reference number throughout the drawings. In the drawings.

DETAILED DESCRIPTION OF THE EMBODIMENTS

Figure 1:
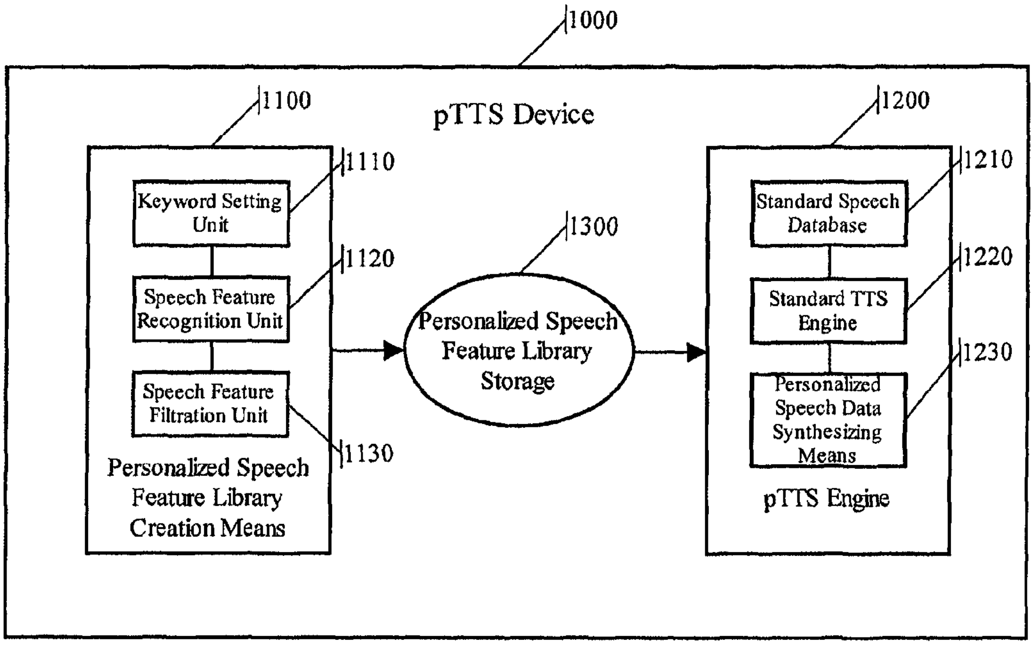
FIG. 1 is a functional diagram illustrating a configuration example of a personalized text-to-speech synthesize device according to an embodiment of the present invention.

These and other aspects of the present invention will be clear in reference to the following descriptions and drawings. These descriptions and drawings specifically disclose some specific embodiments of the present invention to reflect certain ways for implementing the principle of the present invention. But it is appreciated that the scope of the present invention is not limited thereby. On the contrary, the present invention is intended to include all changes, modifications and equivalents falling within the range of spirit and gist of the accompanied claims.

Features described and/or illustrated with respect to an embodiment can be used in the same way or similar way in one or more other embodiments, and/or in combination with the features of other embodiment or replace the features of other embodiment.

To be emphasized, the terms "include/including, comprise/comprising" used in the present invention mean presence of the stated feature, integer, step or component, but it does not exclude the presence or addition of one or more other features, integers, steps, components or a group thereof.

An exemplary embodiment of the present invention is firstly described as follows.

A group of keywords are set in advance. When a random speech fragment of a specific speaker is acquired in a normal speaking process, the speech fragment is compared with the preset keywords, and personalized speech features of the specific speaker are recognized according to pronunciations in the speech fragment of the specific speaker corresponding to the keywords, thereby creating a personalized speech feature library of the specific speaker. A speech synthesis of text messages from the specific speaker is performed based on the personalized speech feature library, thereby generating a synthesized speech having pronunciation characteristics of the specific speaker. Alternatively, the random speech fragment of the specific speaker may also be previously stored in a database.

In order to easily recognize the speech characteristics of the specific speaker from a random speech fragment of the specific speaker, the selection of the keywords is especially important. The features and selection conditions of the keywords in the present invention are exemplarily described as follows:

1) A keyword is preferably a minimum language unit (e.g., morpheme of Chinese and single word of English), including high frequency character, high frequency pause word, onomatopoeia, transitional word, interjection, article (English) and numeral, etc;

2) A keyword should be easily recognizable and polyphone is avoided as much as possible; on the other hand, it should reflect features essential for personalized speech synthesis, such as intonation, timbre, rhythm, halt, etc. of the speaker;

3) A keyword should frequently occur in a random speech fragment of the speaker; if a word seldom used in a talking process is used as the keyword, it may be difficult to recognize the keyword from a random speech fragment of the speaker, and hence a personalized speech feature library cannot be created efficiently. In other words, a keyword shall be a frequently used word. For example, in daily English talks, people often start with "hi", thus such a word may be set as a keyword;

4) A group of general keywords may be selected with respect to any kind of language, furthermore, some additional keywords may be defined with respect to persons of different occupations and personalities, and a user can use these additional and general keywords in combination based on sufficient acquaintance of the speaker; and 5) The number of keywords is dependent on the language type (Chinese, English, etc.), the system processing capacity (more keywords may be provided for a high performance system, and less keywords may be provided for a lower performance apparatus such as mobile phone, e.g., due to restrictions on size, power and cost, while the synthesis effect will be discounted accordingly).

The embodiments of the present invention are described in detail as follows with reference to the drawings.

FIG. 1 illustrates a structural block diagram of a personalized TTS (pTTS) device 1000 according to a first embodiment of the present invention.

The pTTS device 1000 may include a personalized speech feature library creator 1100, a pTTS engine 1200 and a personalized speech feature library storage 1300.

The personalized speech feature library creator 1100 recognizes speech features of a specific speaker from a speech fragment of the specific speaker based on preset keywords, and stores the speech features in association with (an identifier of) the specific speaker into the personalized speech feature library storage 1300.

For example, the personalized speech feature library creator 1100 may include a keyword setting unit 1110, a speech feature recognition unit 1120 and a speech feature filtration unit 1130.

The keyword setting unit 1110 may be configured to set one or more keywords suitable for reflecting the pronunciation characteristics of the specific speaker with respect to a specific language, and store the keywords in association with (an identifier of) the specific speaker.

Figure 2:
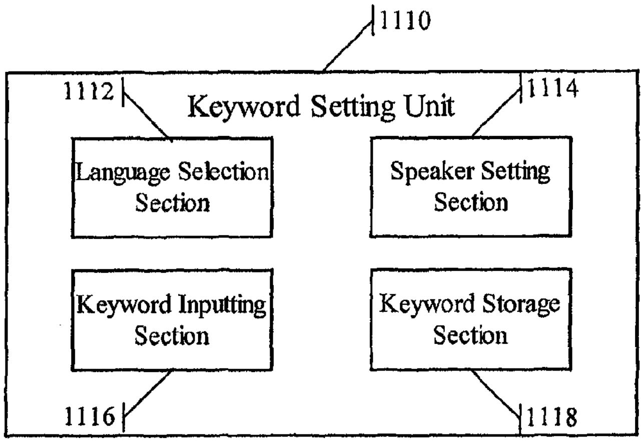
FIG. 2 is a functional diagram illustrating a configuration example of a keyword setting unit included in the personalized text-to-speech synthesizing device according to an embodiment of the present invention.
Figures 3, 4:
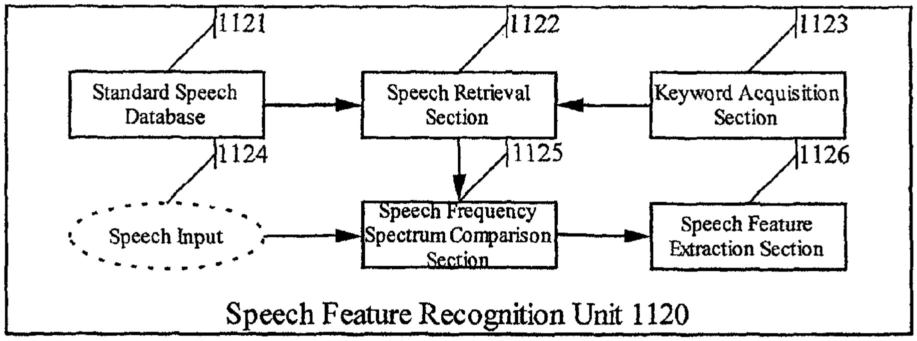
FIG. 3 is an example illustrating keyword storage data entries.
FIG. 4 is a functional diagram illustrating a configuration example of a speech feature recognition unit included in the personalized text-to-speech synthesizing device according to an embodiment of the present invention.

FIG. 2 schematically illustrates a functional diagram of the keyword setting unit 1110. As shown in FIG. 2, the keyword setting unit 1110 may include a language selection section 1112, a speaker setting section 1114, a keyword inputting section 1116 and a keyword storage section 1118. The language selection section 1112 is configured to select different languages, such as Chinese, English, Japanese, etc. The speaker setting section 1114 is configured to set keywords with respect to different speakers or speaker groups. For example, persons of different regions and job scopes may use different words, thus different keywords can be set with respect to persons of different regions and job scopes, for example, keywords can be set separately with respect to certain special persons, so as to improve the efficiency and accuracy of recognizing speech feature of a speaker from a random speech fragment of the speaker. The keyword inputting section 1116 is configured to input keywords. The keyword storage section 1118 is configured to store the language selected by the language selection section 1112, the speaker (or speaker group) set by the speaker setting section 1114 and the keyword inputted by the keyword inputting section 1116 in association with each other. For instance, FIG. 3 illustrates an example of data entries stored in the keyword storage section 1118. The keyword may include dedicated keyword in addition to general keyword.

It will be appreciated that a key word may be preset, e.g., be preset when a product is shipped. Thus the keyword setting unit 1110 is not an indispensable component, and it is illustrated herein just for a purpose of complete description. It will also be appreciated that the configuration of the keyword setting unit 1110 is also not limited by the form illustrated in FIG. 2, and any configuration to be conceived by a person skilled in the art, which is capable of inputting and storing the keyword, is possible. For example, a group of keywords may be preset, and then the user selects and sets some or all of the keywords suitable for specific speaker (speaker group). The number of the keywords may also be set randomly.

Further referring to FIG. 1, when receiving a random speech fragment of a specific speaker, the speech feature recognition unit 1120 may recognize whether a keyword associated with the specific speaker occurs in the received random speech fragment of the specific speaker, based on the keywords stored in the keyword storage section 1118 of the keyword setting unit 1110 with respect to respective specific speakers (speaker group), and if the result is "YES", recognize speech features of the specific speaker according to the standard pronunciation of the recognized keyword and the pronunciation of the specific speaker, otherwise continue to receive a new speech fragment.

For example, whether a specific keyword occurs in a speech fragment can be judged through a speech frequency spectrum comparison. An example of configuration of the speech feature recognition unit 1120 is described as follows referring to FIG. 4.

FIG. 4 illustrates an example of configuration of the speech feature recognition unit adopting speech frequency spectrum comparison. As shown in FIG. 4, the speech feature recognition unit 1120 includes a standard speech database 1121, a speech retrieval section 1122, a keyword acquisition section 1123, a speech frequency spectrum comparison section 1125 and a speech feature extraction section 1126. The standard speech database 1121 stores standard speeches of various morphemes in a text-speech corresponding mode. According to keywords associated with the speaker of a speech input 1124 (these keywords may be set by the user or preset when a product is shipped), acquired by the keyword acquisition section 1123 from the keyword storage section 1118 of the keyword setting unit 1110, the speech retrieval section 1122 retrieves standard speech corresponding to the keyword from the standard speech database 1121. The speech frequency spectrum comparison section 1125 carries out speech frequency spectrum (e.g., frequency domain signal acquired after performing Fast Fourier Transform (FFT) on time domain signal) comparisons between the speech input 1124 (e.g., speech fragment 1124 of specific speaker) and standard speeches of respective keywords retrieved by the speech retrieval section 1122, respectively, so as to determine whether any keyword associated with the specific speaker occurs in the speech fragment 1124. This process may be implemented in reference to the prior art speech recognition. But the keyword recognition of the present invention is simpler than the standard speech recognition. The standard speech recognition needs to accurately recognize the text of the speech input, while the present invention only needs to recognize some keywords commonly used in the spoken language of the specific speaker. In addition, the present invention does not have a strict requirement of the recognition accuracy. The emphasis of the present invention is to search speech fragment close to (ideally, same as) the standard pronunciation of the keyword in speech frequency spectrum characteristics, from a segment of continuous speech (in other words, a standard speech recognition technology will recognize the speech fragment as the keyword, although it may be a misrecognition), and hence recognize the personalized speech feature of the speaker by using the speech fragment. In addition, the keyword is set in consideration of the repeatability of the keyword in a random speech fragment of the speaker, i.e., the keyword possibly occurs for several times, and this repeatability is propitious to the keyword recognition. When a keyword is "recognized" in the speech fragment, the speech feature extraction section 1126, based on the standard speech of the keyword and speech fragment corresponding to the keyword, recognizes, extracts and stores speech features of the speaker, such as frequency, volume, rhythm and end sound. The extraction of corresponding speech feature parameters according to a segment of speeches can be carried out in reference to the prior art, and herein is not described in details. In addition, the listed speech features are not exhaustive, and these speech features are not necessarily used at the same time, instead, appropriate speech features can be set and used upon actual application occasions, which is conceivable to persons skilled in the art after reading the disclosure of the present application. In addition, the speech spectrum data can be acquired not only by performing FFT conversion to the time domain speech signal, but also by performing other time-domain to frequency-domain transform (e.g., a wavelet transform) to the speech signal in time domain. A person skilled in the art may select an appropriate time-domain to frequency-domain transform based on characteristics of the speech feature to be captured. In addition, different time-domain to frequency-domain transforms can be adopted for different speech features, so as to appropriately extract the speech feature, and the present invention is not limited by just applying one time-domain to frequency-domain transform to the speech signal in time domain.

In a speech fragment (or a speaking process), with respect to each keyword stored in the keyword storage section 1118, corresponding speech features of the speaker will be extracted and stored. If a certain keyword is not "recognized" in the speech fragment of the speaker, various standard speech features (e.g., acquired from the standard speech database or set as the default values) of the keyword can be stored for later statistical analysis. In addition, in a speech fragment (or a speaking process), a certain keyword may be repeated for several times. In this case, respective speech segments corresponding to the keyword may be averaged, and speech feature corresponding to the keyword may be acquired based on the average speech segment; or alternatively, speech feature corresponding to the keyword may be acquired based on the last speech segment. Therefore, for example, a matrix in the following form can be obtained in a speaking process (or a speech fragment):

$$\begin{bmatrix} F_{11} & F_{12} & \cdots & F_{1n} \\ F_{21} & F_{22} & \cdots & F_{2n} \\ \vdots & \vdots & \vdots & \vdots \\ F_{m1} & F_{m2} & \cdots & F_{mn} \end{bmatrix},$$

wherein n is a natural number indicating the number of the keywords, and m is a natural number indicating the number of the selected speech features. Each element $F_{ij}$ (i and j are both natural numbers) in the matrix represents recognized speech feature parameter with respect to the $i^{th}$ feature of the $j^{th}$ keyword. Each column of the matrix constitutes a speech feature vector with respect to the keyword.

To be noted, during a speaking process or a speech fragment of specified time duration, all speech features of all keywords are not necessarily recognized, thus in order to facilitate the processing, as mentioned previously, the standard speech feature data or default parameter values may be used to fill up the element not recognized in the speech feature parameter matrix for the convenience of subsequent processing.

Further refer to FIG. 1 to describe the speech feature filtration unit 1130. The speech feature filtration unit 1130 filters out abnormal speech features through statistical analysis while retaining speech features reflecting the normal pronunciation characteristics of the specific speaker and processes these speech features (e.g., averaging), when the speech features (e.g., the above-mentioned matrix of speech feature parameters) of the specific speaker recognized and stored by the speech feature recognition unit 1120 reach a predetermined number (e.g., 50), for example, and thereby creates a personalized speech feature library (speech feature matrix) associated with the specific speaker, and stores the personalized speech feature library in association with (e.g., the identifier, telephone number, etc. of) the specific speaker for subsequent use. The process of filtering abnormal speech features will be later described in details. Besides, instead of extracting a predetermined number of speech features, it may be considered, for example, to finish the operation of the personalized speech feature library creator 1100 when the extracted speech features tend to be stable (the variation between two consecutively extracted speech features is less than or equal to a predetermined threshold).

The pTTS engine 1200 includes a standard speech database 1210, a standard TTS engine 1220 and a personalized speech data synthesizing means 1230. Like the standard speech database 1121, the standard speech database 1210 stores standard text-speech data. The standard TTS engine 1220 firstly analyzes the inputted text information and divide it into appropriate text units, then selects speech units corresponding to respective text units in reference to the text-speech data stored in the standard speech database 1210, and splicing these speech units to generate standard speech data. The personalized speech data synthesizing means 1230 adjusts rhythm, volume, etc. of the standard speech data generated by the standard TTS engine 1220, e.g., directly inserting features such as end sound, pause, etc., in reference to the personalized speech data, which is corresponding to the sender of the text information and stored in the personalized speech feature library storage 1300, thereby generates speech output having pronunciation characteristics of the sender of the text information. The generated personalized speech data may be played directly with a sound-producing device such as loudspeaker, stored for future use, or transmitted through a network.

The above description is just an example of the pTTS engine 1200, and the present invention is not limited thereby. A person skilled in the art can select any other known way to synthesize speech data having personalized pronunciation characteristics based on the inputted text information and in reference to the personalized speech feature data.

In addition, the above descriptions are made in reference to FIGS. 1, 2 and 4, which illustrate the configuration of the pTTS device in the form of block diagrams, but the pTTS device of the present invention is not necessarily composed of these separate units/components. The illustrations of the block diagrams are mainly logical divisions with respect to functionality. The units/components illustrated by the block diagrams can be implemented in hardware, software and firmware independently or jointly, and particularly, functions corresponding to respective parts of the block diagrams can be implemented in a form of computer program code running on a general computing device. In the actual implementation, the functions of some block diagrams can be merged, for example, the standard speech databases 1210 and 1121 may be the same one, and herein the two standard speech databases are illustrated just for the purpose of clarity.

Alternatively, a speech feature creation unit of other form may be provided to replace the speech feature filtration unit 1130. For example, with respect to each speech fragment (or each speaking process) of the specific speaker, the speech feature recognition unit 1120 generates a speech feature matrix $F_{speech,\ current}$. The speech feature creation unit generates a speech feature matrix to be stored in the personalized speech feature library storage 1300 through the following equation in a recursive manner:

$$F_{speech,final}=\alpha F_{speech,previous}+(1-\alpha)F_{speech,current}$$

Wherein, $F_{speech,\ current}$ is the speech feature matrix currently generated by the speech feature recognition unit 1120, $F_{speech,\ previous}$ is the speech feature matrix associated with the specific speaker stored in the personalized speech feature library storage 1300, $F_{speech,\ final}$ is the speech feature matrix finally generated and to be stored in the personalized speech feature library storage 1300, $\alpha$ (alpha) is a recursion factor, $0<\alpha<1$, and it indicates a proportion of history speech feature. The speech feature of a specific speaker may vary with time due to various factors (e.g., body condition, different occasions, etc.). In order to make the finally synthesized speech is close to the latest pronunciation characteristics of the specific speaker as much as possible, $\alpha$ can be set in a small value, e.g., 0.2, so as to decrease the proportion of history speech feature. Any other equation designed for computing speech feature shall also be covered in the range of the present invention.

Figure 5:
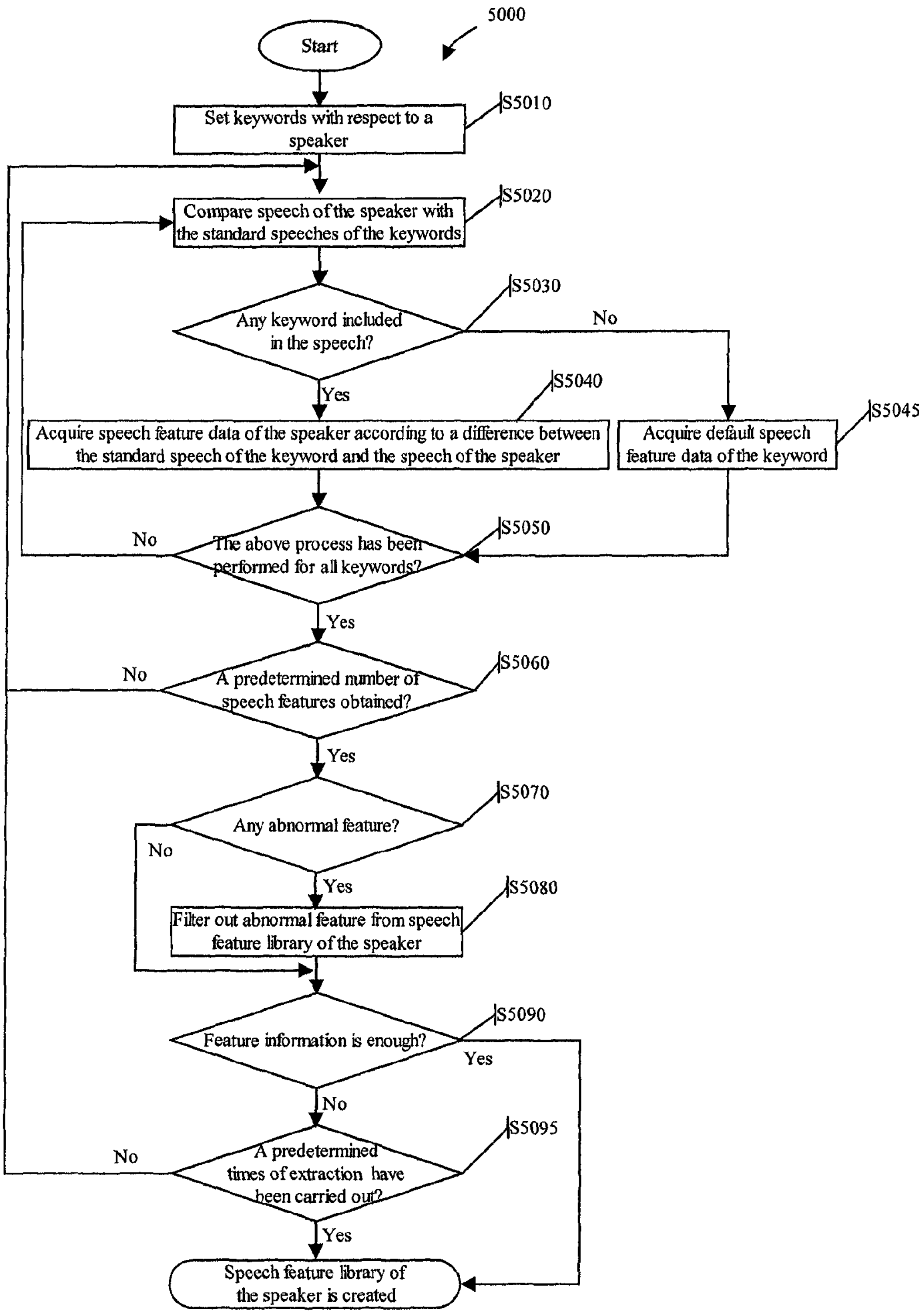
FIG. 5 is a flowchart (sometimes referred to as a logic diagram) illustrating a personalized text-to-speech method according to an embodiment of the present invention.

A personalized speech feature extraction process according to a second embodiment of the present invention is detailedly described as follows in reference to the flowchart 5000 (also sometimes referred to as a logic diagram) of FIG. 5.

Firstly, in step S5010, one or more keywords suitable for reflecting the pronunciation characteristics of the specific speaker are set with respect to a specific language (e.g., Chinese, English, Japanese, etc.), and the set keywords are stored in association with (identifier, telephone number, etc. of) the specific speaker.

As mentioned previously, alternatively, the keywords may be preset when a product is shipped, or be selected with respect to the specific speaker from pre-stored keywords in step S5010.

In step S5020, for example, when speech data of a specific speaker is received in a speaking process, general keyword and/or dedicated keyword associated with the specific speaker are acquired from the stored keywords, standard speech corresponding to one of the acquired keyword is retrieved from the standard speech database, and a comparison between the received speech data and the retrieved standard speech corresponding to the keyword is performed in terms of their respective speech spectrums, which are derived by performing a time-domain to frequency-domain transform (such as a Fast Fourier Transform or a wavelet transform) to the respective speech data in time domain, so as to recognize whether the keyword exists in the received speech data.

In step S5030, if the keyword is not recognized in the received speech data, the procedure turns to step S5045 otherwise the procedure turns to step S5040.

In step S5040, speech features of the speaker are extracted based on the standard speech of the keyword and corresponding speech of the speaker (e.g., speech spectrum acquired by performing a time-domain to frequency-domain transform to the speech data in time domain), and are stored.

In step S5045, default speech features of the keyword are acquired from the standard speech database or default setting data and are stored.

In steps S5040 and S5045, the acquired speech feature data of the keyword constitutes a speech feature vector.

Next, in step S5050, it is judged whether the speech feature extraction is performed to each keyword associated with the specific speaker. If the judging result is "No", the procedure turns to step S5020, and repeats steps S5030 to S5045 with respect to the same speech fragment and a next keyword, so as to acquire a speech feature vector corresponding to the keyword.

If the judging result is "Yes" in step S5050, for example, the speech feature vectors can be formed into a speech feature matrix and then stored. Next, in step S5060, it is judged whether the acquired speech feature matrices reach a predetermined number (e.g., 50). If the judging result is "No", the procedure waits for a new speaking process (or accepts input of new speech data), and then repeat steps S5020 to S5050.

When it is judged that the acquired personalized speech features (speech feature matrices) reach the predetermined number in step S5060, the procedure turns to step S5070, in which a statistical analysis is performed on these personalized speech features (speech feature matrices) to determine whether there is any abnormal speech feature, and if there is no abnormal speech feature, the procedure turns to step S5090, otherwise to step S5080.

For example, with respect to a specific speech feature parameter, a predetermined number (e.g., 50) of its samples are used for calculating an average and a standard deviation, and then a sample whose deviation from the average exceeds the standard deviation is determined as an abnormal feature. For example, a speech feature matrix, in which a sum of deviation between the value of each element and an average value corresponding to the element exceeds a sum of standard deviation corresponding to each element, can be determined as an abnormal speech feature matrix and thus be deleted. There are several methods for calculating the average, such as arithmetic average and logarithmic average.

The methods for determining abnormal features are also not limited to the above method. Any other method, which determines whether a sample of speech feature obviously deviates from the normal speech feature of a speaker, will be included in the scope of the present invention.

In step S5080, abnormal speech features (speech feature matrices) are filtered out, and then the procedure turns to step S5090.

In step S5090, it is judged whether the generated personalized speech features (speech feature matrices) reach a predetermined number (e.g., 50), if the result is "No", the procedure turns to step S5095, and if the result is "Yes", the personalized speech features are averaged and the averaged personalized speech feature is stored for use in the subsequent TTS process, then the personalized speech feature extraction is completed.

In step S5095, it is judged whether a predetermined times (e.g., 100 times) of personalized speech feature recognitions have been carried out, i.e., whether a predetermined number of speech fragments (speaking processes) have been analyzed. If the result is "No", the procedure goes back to step S5020 to repeat the above process, and continue to extract personalized speech features in once more speech speaking process with respect to new speech fragments; and if the result is "Yes", the personalized speech features are averaged and the averaged personalized speech feature is stored for use in the subsequent TTS process, then the personalized speech feature extraction is completed.

In addition, a personalized speech feature may be recognized individually with respect to each keyword, and then the personalized speech feature may be used for personalized TTS of the text message. Thereafter, the personalized speech feature library may be updated continuously in the new speaking process.

The above flowchart is just exemplary and illustrative; a method according to the present invention shall not necessarily include each of the above steps, and some of the steps may be deleted, merged or order-changed. All theses modifications shall be included in the scope of the present invention without deviating from the spirit and scope of the present invention.

The personalized speech feature synthesizing technology of the present invention is further described as follows in combination with the applications in a mobile phone and wireless communication network, or in a computer and network such as Internet.

Figure 6:
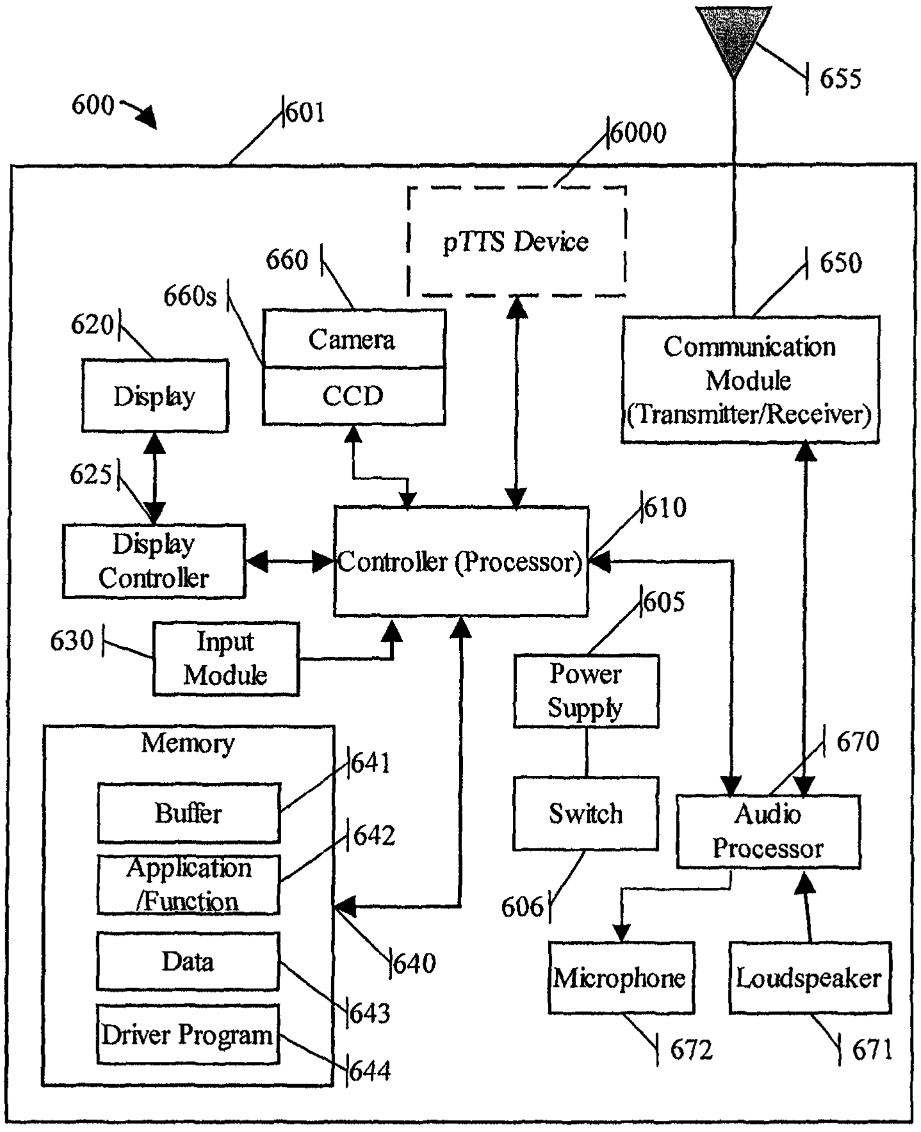
FIG. 6 is a functional diagram illustrating an example of an overall configuration of a mobile phone including the personalized text-to-speech synthesizing device according to an embodiment of the present invention.

FIG. 6 illustrates a schematic block diagram of an operating circuit 601 or system configuration of a mobile phone 600 according to a third embodiment of the present invention, including a pTTS device 6000 according to a first embodiment of the present invention. The illustration is exemplary; other types of circuits may be employed in addition to or instead of the operating circuit to carry out telecommunication functions and other functions. The operating circuit 601 includes a controller 610 (sometimes referred to as a processor or an operational control and may include a microprocessor or other processor device and/or logic device) that receives inputs and controls the various parts and operations of the operating circuit 601. An input module 630 provides inputs to the controller 610. The input module 630 for example is a key or touch input device. A camera 660 may include a lens, shutter, image sensor 660*s* (e.g., a digital image sensor such as a charge coupled device (CCD), a CMOS device, or another image sensor). Images sensed by the image sensor 660*s* may be provided to the controller 610 for use in conventional ways, e.g., for storage, for transmission, etc.

A display controller 625 responds to inputs from a touch screen display 620 or from another type of display 620 that is capable of providing inputs to the display controller 625. Thus, for example, touching of a stylus or a finger to a part of the touch screen display 620, e.g., to select a picture in a displayed list of pictures, to select an icon or function in a GUI shown on the display 620 may provide an input to the controller 610 in conventional manner. The display controller 625 also may receive inputs from the controller 610 to cause images, icons, information, etc., to be shown on the display 620. The input module 630, for example, may be the keys themselves and/or may be a signal adjusting circuit, a decoding circuit or other appropriate circuits to provide to the controller 610 information indicating the operating of one or more keys in conventional manner.

A memory 640 is coupled to the controller 610. The memory 640 may be a solid state memory, e.g., read only memory (ROM), random access memory (RAM), SIM card, etc., or a memory that maintains information even when power is off and that can be selectively erased and provided with more data, an example of which sometimes is referred to as an EPROM or the like. The memory 640 may be some other type device. The memory 640 comprises a buffer memory 641 (sometimes referred to herein as buffer). The memory 640 may include an applications/functions storing section 642 to store applications programs and functions programs or routines for carrying out operation of the mobile phone 600 via the controller 610. The memory 640 also may include a data storage section 643 to store data, e.g., contacts, numerical data, pictures, sounds, and/or any other data for use by the mobile phone 600. A driver program storage section 644 of the memory 640 may include various driver programs for the mobile phone 600, for communication functions and/or for carrying out other functions of the mobile phone 600 (such as message transfer application, address book application, etc.).

The mobile phone 600 includes a telecommunications portion. The telecommunications portion includes, for example, a communications module 650, i.e., transmitter/receiver 650 that transmits outgoing signals and receives incoming signals via antenna 655. The communications module (transmitter/receiver) 650 is coupled to the controller 610 to provide input signals and receive output signals, as may be same as the case in conventional mobile phones. The communications module (transmitter/receiver) 650 also is coupled to a loudspeaker 672 and a microphone 671 via an audio processor 670 to provide audio output via the loudspeaker 672 and to receive audio input from the microphone 671 for usual telecommunications functions. The loudspeaker 672 and microphone 671 enable a subscriber to listen and speak via the mobile phone 600. The audio processor 670 may include any appropriate buffer, decoder, amplifier and the like. In addition, the audio processor 670 is also coupled to the controller 610, so as to locally record sounds via the microphone 671, e.g., add sound annotations to a picture, and sounds locally stored, e.g., the sound annotations to the picture, can be played via the loudspeaker 672.

The mobile phone 600 also comprises a power supply 605 that may be coupled to provide electricity to the operating circuit 601 upon closing of an on/off switch 606.

For telecommunication functions and/or for various other applications and/or functions as may be selected from a GUI, the mobile phone 600 may operate in a conventional way. For example, the mobile phone 600 may be used to make and to receive telephone calls, to play songs, pictures, videos, movies, etc., to take and to store photos or videos, to prepare, save, maintain, and display files and databases (such as contacts or other database), to browse the Internet, to remind a calendar, etc.

The configuration of the pTTS device 6000 included in the mobile phone 600 is substantially same as that of the pTTS device 1000 described in reference to FIGS. 1, 2 and 4, and herein is not described in details. To be noted, dedicated components are generally not required to be provided on the mobile phone 600 to implement the pTTS device 6000, instead, the pTTS device 6000 is implemented in the mobile phone 600 with existing hardware (e.g., controller 610, communication module 650, audio processor 670, memory 640, input module 630 and display 620) and in combination with an application program for implementing the functions of the pTTS device of the present invention. But the present invention does not exclude an embodiment that implements the pTTS device 6000 as a dedicated chip or hardware.

In an embodiment, the pTTS device 6000 can be combined with the telephone book function having been implemented in the mobile phone 600, so as to set and store keywords in association with the contacts in the telephone book. During a session with a contact in the telephone book, the speech of the contact is analyzed automatically or upon instructing, by using the keywords associated with the contact, so as to extract personalized speech features and store the extracted personalized speech features in association with the contact. Subsequently, for example, when a text short message or an E-mail sent by the contact is received, the contents of the text short message or the E-mail can be synthesized into speech data having pronunciation characteristics of the contact automatically or upon instructing, and then outputted via the loudspeaker. The personalized speech features of the subscriber per se of the mobile phone 600 also can be extracted during the session, and subsequently when short message is to be sent through the text transfer function of the mobile phone 600 by the subscriber, the text short message can be synthesized into speech data having pronunciation characteristics of the subscriber automatically or upon instructing, and then transmitted.

Thus, when a subscriber of the mobile phone 600 uses the mobile phone 600 to talk with any contact in the telephone book, personalized speech features of both the counterpart and the subscriber per se can be extracted, and subsequently when the text message being received and to be transmitted, the text message can be synthesized into speech data having pronunciation characteristics of the sender of the text message, and then outputted.

Thus, although not illustrated in the drawings, it will be appreciated that the mobile phone 600 may include: a speech feature recognition trigger section, configured to trigger the pTTS device 6000 to perform a personalized speech feature recognition of speech fragment of any or both speakers in a speech session, when the mobile phone 600 is used for the speech session, thereby to create and store a personalized speech feature library associated with the any or both speakers in the speech session; and a text-to-speech trigger section, configured to enquire whether any personalized speech feature library associated with a sender of a text message or user from whom a text message is received occurs in the mobile phone 600 when the mobile phone 600 is used for transmitting or receiving text messages, trigger the pTTS device 6000 to synthesize the text messages to be transmitted or having been received into a speech fragment when the enquiry result is affirmative, and transmit the speech fragment to the counterpart or present to the local subscriber at the mobile phone 600. The speech feature recognition trigger section and the text-to-speech trigger section may be embedded functions implementable by software, or implemented as menus associated with the speech session function and text transfer function of the mobile phone 600, respectively, or implemented as individual operating switches on the mobile phone 600, operations on which will trigger the speech feature recognition or personalized text-to-speech operations of the pTTS device 6000.

In addition, the mobile phone 600 may have the function of mutually transferring personalized speech feature data between both parties of the session. For example, when subscribers A and B talk with each other through their respective mobile phones a and b, the mobile phone a of the subscriber A can transfer the personalized speech feature data of the subscriber A stored therein to the mobile phone b of the subscriber B, or require to receive the personalized speech feature data of the subscriber B stored in the mobile phone b. Correspondingly, software code or hardware, firmware, etc. can be set in the mobile phone 600.

Therefore, in a speech session using the mobile phone 600, a personalized speech feature recognition can be carried out with respect to the incoming/outgoing speeches, by using the pTTS module, the speech feature recognition trigger module and the pTTS trigger module embedded in the mobile phone 600 automatically or upon instructing, then filter and store the recognized personalized speech features, so that when a text message is received or sent, the pTTS module can synthesize the text message into a speech output by using associated personalized speech feature library. For example, when a subscriber carrying the mobile phone 600 is moving or in other state inconvenient to view the text message, he can listen to the speech-synthesized text message and easily recognize the sender of the text message.

According to another embodiment of the present invention, the previous pTTS module, the speech feature recognition trigger module and the pTTS trigger module can be implemented on the network control device (e.g., radio network controller RNC) of the radio communication network, instead of a mobile terminal. The subscriber of the mobile communication terminal can make settings to determine whether or not to activate the functions of the pTTS module. Thus, the variations of the design of the mobile communication terminal can be reduced, and the occupancy of the limited resources of the mobile communication terminal can be avoided so far as possible.

According to another embodiment of the present invention, the pTTS module, speech feature recognition trigger module and pTTS trigger module can be embedded into computer clients in Internet which are capable of text and speech communications to each other. For example, the pTTS module can be combined with the current instant communication application (e.g., MSN). The current instant communication application can perform text message transmissions as well as audio and video communications. The text message transmission occupies little network resources, but sometimes is inconvenient. The audio and video communications occupies much network resources and sometimes will be interrupted or lagged under the network influence. But according to the present invention, for example, a personalized speech feature library of the subscriber can be created at the computer client during an audio communication process, by combining the pTTS module with the current instant communication application (e.g., MSN), subsequently, when a text message is received, a speech synthesis of the text message can be carried out by using the personalized speech feature library associated with the sender of the text message, and then the synthesized speech is outputted. This overcomes the disadvantage of interruption or lag with the direct audio communication under the network influence, furthermore, any subscriber not at the computer client also can acquire the content of the text message, and recognize the sender of the text message.

According to another embodiment of the present invention, the pTTS module, speech feature recognition trigger module and pTTS trigger module can be embedded into a server in Internet that enables a plurality of computer clients to perform text and speech communications to each other. For example, with respect to a server of instant communication application (e.g., MSN), when a subscriber performs a speech communication through the instant communication application, a personalized speech feature library of the subscriber can be created with the pTTS module. Thus, a database having personalized speech feature libraries of a lot of subscribers can be formed on the server. A subscriber to the instant communication application can enjoy the pTTS service when using the instant communication application at any computer client.

Although the present invention is only illustrated with the above preferred embodiments, a person skilled in the art can easily make various changes and modifications based on the disclosure without departing from the invention scope defined by the accompanied claims. The descriptions of the above embodiments are just exemplary, and do not constitute limitations to the invention defined by the accompanied claims and their equivalents.

It will be appreciated that various portions of the present invention can be implemented in hardware, software, firmware, or a combination thereof. In the described embodiments, a number of the steps or methods may be implemented in software or firmware that is stored in a memory and executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in the flow diagram or otherwise described herein may be understood as representing modules, fragments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood reasonably by those skilled in the art of the present invention.

The logic and/or steps represented in the flow diagrams or otherwise described herein, for example, may be considered an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this Specification, a "computer-readable medium" can be any means that can contain, store, communicate, propagate, or transport the program for use by or in combination with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection portion (electronic device) having one or more wires, a portable computer diskette (magnetic device), a random access memory (RAM) (electronic device), a read-only memory (ROM) (electronic device), an erasable programmable read-only memory (EPROM or Flash memory) (electronic device), an optical fiber (optical device), and a portable compact disc read-only memory (CDROM) (optical device). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The above description and drawings depict the various features of the invention. It shall be appreciated that the appropriate computer code could be prepared by a person skilled in the art to carry out the various steps and processes described above and illustrated in the drawings. It also shall be appreciated that the various terminals, computers, servers, networks and the like described above may be of any type and that the computer code may be prepared to carry out the invention using such apparatus in accordance with the disclosure hereof.

Specific embodiments of the present invention are disclosed herein. A person skilled in the art will easily recognize that the invention may have other applications in other environments. In the fact, many embodiments and implementations are possible. The accompanied claims are in no way intended to limit the scope of the present invention to the specific embodiments described above. In addition, any recitation of "device configured to . . . " is intended to evoke a device-plus-function reading of an element and a claim, whereas, any element that does not specifically use the recitation "device configured to . . . ", is not intended to be read as a device-plus-function element, even if the claim otherwise comprises the word "device".

Although the present invention has been illustrated and described with respect to a certain preferred embodiment or multiple embodiments, it is obvious that equivalent alterations and modifications will occur to a person skilled in the art upon the reading and understanding of this specification and the accompanied drawings. In particular regard to the various functions performed by the above elements (components, assemblies, devices, compositions, etc.), the terms (including a reference to a "device") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the present invention. In addition, although a particular feature of the invention may have been described above with respect to only one or more of several illustrated embodiments, such feature may be combined with one or more other features of the other embodiments, as may be desired and advantageous for any given or particular application.

What is claimed is:

1. A personalized text-to-speech synthesizing device, comprising:

a processor;

a memory;

a personalized speech feature library creator, configured to recognize personalized speech features of a specific speaker by recognizing whether a keyword from preset keywords associated with the specific speaker occurs in a random speech fragment of the specific speaker that includes multiple words including the keyword and speech in addition to the keyword, the random speech fragment being part of a multiple speaker conversation including the speaker, and, if the keyword is found in the random speech fragment, recognizing the personalized speech features of the specific speaker based on a comparison of a standard speech of the keyword and the speech of the keyword by the specific speaker in the random speech fragment, thereby to create a personalized speech feature library associated with the specific speaker, and store the personalized speech feature library in association with the specific speaker; and a text-to-speech synthesizer, configured to perform a speech synthesis of a text message from the specific speaker, based on the personalized speech feature library associated with the specific speaker and created by the personalized speech feature library creator, thereby to generate and output a speech fragment having pronunciation characteristics of the specific speaker.

2. The personalized text-to-speech synthesizing device according to claim 1, wherein the personalized speech feature library creator comprises:

a keyword setting unit, configured to set one or more keywords suitable for reflecting the pronunciation characteristics of the specific speaker with respect to a specific language, and store the set keywords in association with the specific speaker;

a speech feature recognition unit, configured to recognize the speech features of the specific speaker according to a standard pronunciation of the recognized keyword and the pronunciation of the specific speaker; and a speech feature filtration unit, configured to filter out abnormal speech features through statistical analysis while retaining speech features reflecting the normal pronunciation characteristics of the specific speaker, when the speech features of the specific speaker recognized by the speech feature recognition unit reach a predetermined number, thereby to create the personalized speech feature library associated with the specific speaker, and store the personalized speech feature library in association with the specific speaker.

3. The personalized text-to-speech synthesizing device according to claim 2, wherein the keyword setting unit is further configured to set keywords suitable for reflecting the pronunciation characteristics of the specific speaker with respect to a plurality of specific languages.

4. The personalized text-to-speech synthesizing device according to claim 2, wherein the speech feature recognition unit is further configured to recognize whether the keyword occurs in the speech fragment of the specific speaker by comparing the speech fragment of the specific speaker with the standard pronunciation of the keyword in terms of their respective speech frequency spectrums, which are derived by performing a time-domain to frequency-domain transform to the respective speech data in time domain.

5. The personalized text-to-speech synthesizing device according to claim 1, wherein the personalized speech feature library creator is further configured to update the personalized speech feature library associated with the specific speaker when a new speech fragment of the specific speaker is received.

6. The personalized text-to-speech synthesizing device according to claim 2, wherein parameters representing the speech features include frequency, volume, rhythm and end sound.

7. The personalized text-to-speech synthesizing device according to claim 6, wherein the speech feature filtration unit is further configured to filter speech features with respect to the parameters representing the respective speech features.

8. The personalized text-to-speech synthesizing device according to claim 1, wherein the keyword is a monosyllable high frequency word.

9. A personalized text-to-speech synthesizing method, comprising:

presetting one or more keywords with respect to a specific language;

receiving a random speech fragment of a specific speaker that includes multiple words including a keyword from the preset one or more keywords and speech in addition to the keyword, wherein the random speech fragment is part of a multiple speaker conversation including the speaker;

recognizing personalized speech features of the specific speaker by recognizing whether the keyword is found in the random speech fragment of the specific speaker, and, if the keyword is found in the random speech fragment, recognizing the personalized speech features of the specific speaker based on a comparison of a standard speech of the keyword and the speech of the keyword by the specific speaker in the random speech fragment, thereby creating a personalized speech feature library associated with the specific speaker, and storing in a memory the personalized speech feature library in association with the specific speaker; and performing a speech synthesis of a text message from the specific speaker, based on the personalized speech feature library associated with the specific speaker, thereby generating and outputting a speech fragment having pronunciation characteristics of the specific speaker.

10. The personalized text-to-speech synthesizing method according to claim 9, wherein the keywords are suitable for reflecting the pronunciation characteristics of the specific speaker and stored in association with the specific speaker.

11. The personalized text-to-speech synthesizing method according to claim 10, wherein creating the personalized speech feature library associated with the specific speaker comprises:

recognizing the speech features of the speaker according to a standard pronunciation of the recognized keyword and the pronunciation of the specific speaker; and filtering out abnormal speech features through statistical analysis while retaining speech features reflecting the normal pronunciation characteristics of the specific speaker, when the recognized speech features of the specific speaker reach a predetermined number, thereby creating the personalized speech feature library associated with the specific speaker, and storing the personalized speech feature library in association with the specific speaker.

12. The personalized text-to-speech synthesizing method according to claim 11, wherein keywords suitable for reflecting the pronunciation characteristics of the specific speaker are set with respect to a plurality of specific languages.

13. The personalized text-to-speech synthesizing method according to claim 11, wherein recognizing whether the keyword occurs in the speech fragment of the specific speaker is performed by comparing the speech fragment of the specific speaker with the standard pronunciation of the keyword in terms of their respective speech spectrums, which are derived by performing a time-domain to frequency-domain transform to the respective speech data in time domain.

14. The personalized text-to-speech synthesizing method according to claim 9, wherein creating the personalized speech feature library comprising updating the personalized speech feature library associated with the specific speaker when a new speech fragment of the specific speaker is received.

15. The personalized text-to-speech synthesizing method according to claim 11, wherein parameters representing the speech features include frequency, volume, rhythm and end sound.

16. The personalized text-to-speech synthesizing method according to claim 15, wherein the speech features are filtered with respect to the parameters representing the respective speech features.

17. The personalized text-to-speech synthesizing method according to claim 9, wherein the keyword is a monosyllable high frequency word.

18. A communication terminal capable of text transmission and speech session, wherein a number of the communication terminals are connected to each other through a wireless communication network or a wired communication network, so that a text transmission or speech session can be carried out therebetween, wherein the communication terminal comprises a text transmission synthesizing device, a speech session device and the personalized text-to-speech synthesizing device according to claim 1.

19. The communication terminal according to claim 18, further comprising:

a speech feature recognition trigger device, configured to trigger the personalized text-to-speech synthesizing device to perform a personalized speech feature recognition of speech fragment of any or both speakers in a speech session, when the communication terminal is used for the speech session, thereby to create and store a personalized speech feature library associated with the any or both speakers in the speech session; and a text-to-speech trigger synthesis device, configured to enquire whether any personalized speech feature library associated with a subscriber transmitting a text message or a subscriber from whom a text message is received is included in the communication terminal when the communication terminal is used for transmitting or receiving text messages, and trigger the personalized text-to-speech synthesizing device to synthesize the text messages to be transmitted or having been received into a speech fragment when the enquiry result is affirmative, and transmit the speech fragment to the counterpart or display to the local subscriber at the communication terminal.

20. The communication terminal according to claim 18, wherein the communication terminal is a mobile phone.

21. The communication terminal according to claim 18, wherein the communication terminal is a computer client.

22. A communication system capable of text transmission and speech session, comprising a controlling device, and a plurality of communication terminals capable of text transmission and speech session via the controlling device, wherein the controlling device is provided with the personalized text-to-speech synthesizing device according to claim 1.

23. The communication system according to claim 22, wherein the controlling device further comprises:

a speech feature recognition trigger device, configured to trigger the personalized text-to-speech synthesizing device to perform a personalized speech feature recognition of speech fragments of speakers in a speech session, when two or more of the plurality of communication terminals are used for the speech session via the controlling device, thereby to create and store personalized speech feature libraries associated with respective speakers in the speech session respectively; and a text-to-speech trigger synthesis device configured to enquire whether any personalized speech feature library associated with a subscriber transmitting a text message occurs in the controlling device when the controlling device receives the text messages transmitted by any of the plurality of communication terminals to another communication terminal, trigger the personalized text-to-speech synthesizing device to synthesize the text messages having been received into a speech fragment when the enquiry result is affirmative, and transfer the speech fragment to the another communication terminal.

24. The communication system according to claim 22, wherein the controlling device is a wireless network controller, the communication terminal is a mobile phone, and the wireless network controller and the mobile phone are connected to each other through a wireless communication network.

25. The communication system according to claim 22, wherein the controlling device is a server, the communication terminal is a computer client, and the server and the computer client are connected to each other through Internet.

26. A personalized speech feature extraction device, comprising:

a processor;

a memory;

a keyword setting unit, configured to set one or more keywords suitable for reflecting the pronunciation characteristics of a specific speaker with respect to a specific language, and store the keywords in association with the specific speaker;

a speech feature recognition unit, configured to recognize whether any keyword associated with the specific speaker occurs in a random speech fragment of the specific speaker that includes multiple words including the keyword and speech in addition to the keyword, the random speech fragment obtained from a multiple speaker conversation including the speaker, and when a keyword associated with the specific speaker is found in the speech fragment of the specific speaker, recognize speech features of the specific speaker according to a standard pronunciation of the recognized keyword and the pronunciation of the speaker;

a speech feature filtration unit, configured to filter out abnormal speech features from the keyword as found in the speech fragment through statistical analysis while retaining speech features reflecting the normal pronunciation characteristics of the specific speaker, when the speech features of the specific speaker recognized by the speech feature recognition unit reach a predetermined number, thereby to create a personalized speech feature library associated with the specific speaker, and store the personalized speech feature library in association with the specific speaker; and a text-to-speech synthesizer, configured to perform a speech synthesis of a text message from the specific speaker, based on the stored personalized speech feature library associated with the specific speaker.

27. The personalized speech feature extraction device according to claim 26, wherein the keyword setting unit is further configured to set keywords suitable for reflecting the pronunciation characteristics of the specific speaker with respect to a plurality of specific languages.

28. The personalized speech feature extraction device according to claim 26, wherein the speech feature recognition unit is further configured to recognize whether the keyword occurs in the speech fragment of the specific speaker by comparing the speech fragment of the specific speaker with the standard pronunciation of the keyword in terms of their respective speech spectrums, which are derived by performing a time-domain to frequency-domain transform to the respective speech data in time domain.

29. The personalized speech feature extraction device according to claim 26, wherein parameters representing the speech features include frequency, volume, rhythm and end sound.

30. The personalized speech feature extraction device according to claim 29, wherein the speech feature filtration unit is further configured to filter out speech features with respect to the parameters representing the respective speech features.

31. The personalized speech feature extraction device according to claim 26, wherein the keyword is a monosyllable high frequency word.

32. A personalized speech feature extraction method, comprising:

setting one or more keywords suitable for reflecting the pronunciation characteristics of a specific speaker with respect to a specific language, and storing in a memory the keywords in association with the specific speaker;

recognizing whether any keyword associated with the specific speaker occurs in a random speech fragment of the specific speaker obtained from a multiple speaker conversation including the speaker and that includes multiple words including the keyword and speech in addition to the keyword, and when a keyword associated with the specific speaker is found in the speech fragment of the specific speaker, recognizing speech features of the specific speaker according to a standard pronunciation of the recognized keyword and the pronunciation of the speaker; and filtering out abnormal speech features from the keyword as found in the speech fragment through statistical analysis while retaining speech features reflecting the normal pronunciation characteristics of the specific speaker, when the speech features of the specific speaker recognized by the speech feature recognition unit reach a predetermined number, thereby creating a personalized speech feature library associated with the specific speaker, and storing the personalized speech feature library in association with the specific speaker; and performing a speech synthesis of a text message from the specific speaker based on the stored personalized speech feature library associated with the specific speaker.

33. The personalized speech feature extraction method according to claim 32, wherein the setting comprises: setting keywords suitable for reflecting the pronunciation characteristics of the specific speaker with respect to a plurality of specific languages.

34. The personalized speech feature extraction method according to claim 32, wherein the recognizing comprises: recognizing whether the keyword occurs in the speech fragment of the specific speaker by comparing the speech fragment of the specific speaker with the standard pronunciation of the keyword in terms of their respective speech spectrum.

35. The personalized speech feature extraction method according to claim 32, wherein parameters representing the speech features include frequency, volume, rhythm and end sound.

36. The personalized speech feature extraction method according to claim 35, wherein the filtering comprising: filtering out speech features with respect to the parameters representing the respective speech features.

37. The personalized speech feature extraction method according to claim 32, wherein the keyword is a monosyllable high frequency word.

* * * * *